Figure 1:
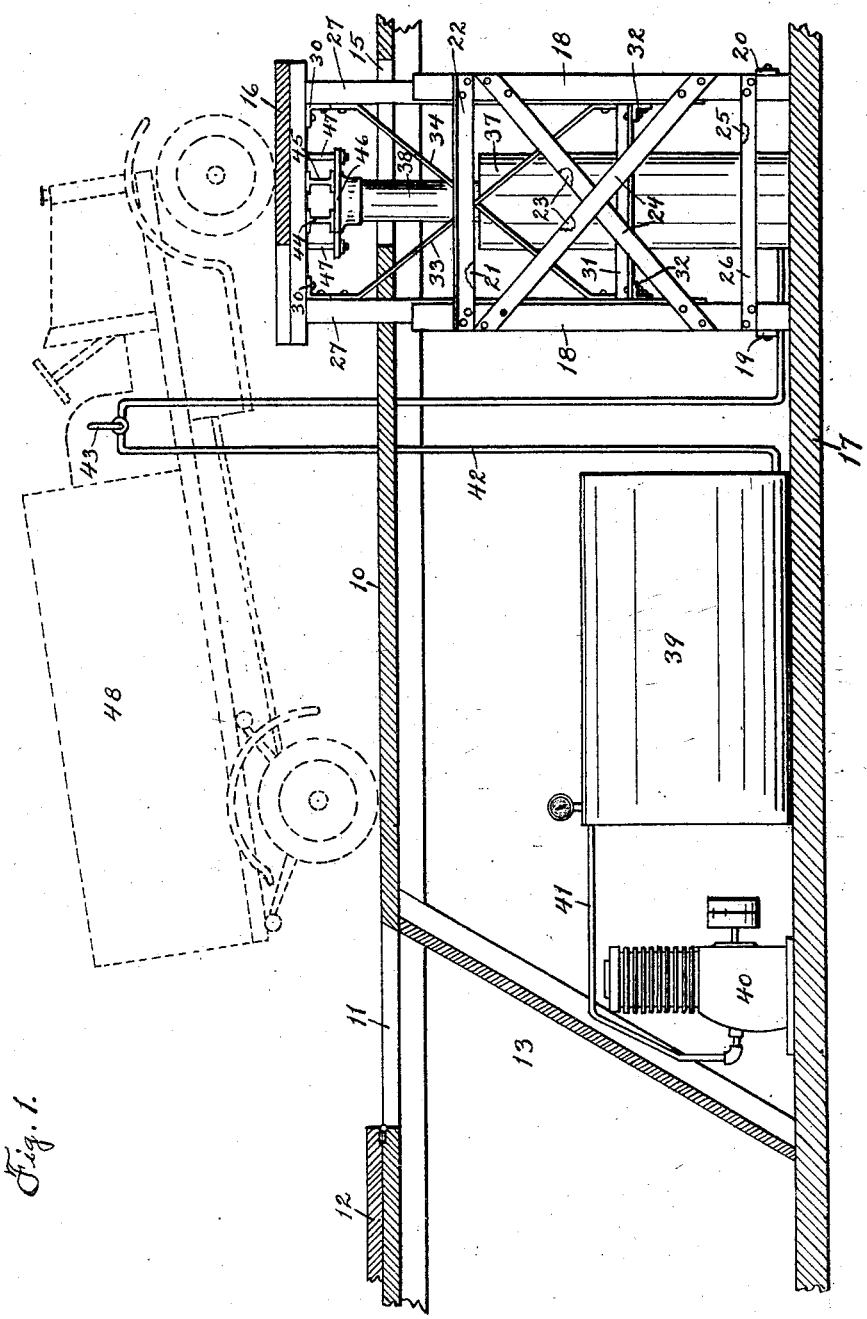

May 20, 1924.  
W. C. MYERS  
VEHICLE DUMPING MECHANISM  
Filed March 19, 1923  
1,494,618  
2 Sheets-Sheet 1

INVENTOR  
Wm. C. Myers  
BY Earl M. Sinclair  
ATTORNEY

May 20, 1924.
W. C. MYERS
VEHICLE DUMPING MECHANISM
Filed March 19, 1923   2 Sheets-Sheet 2
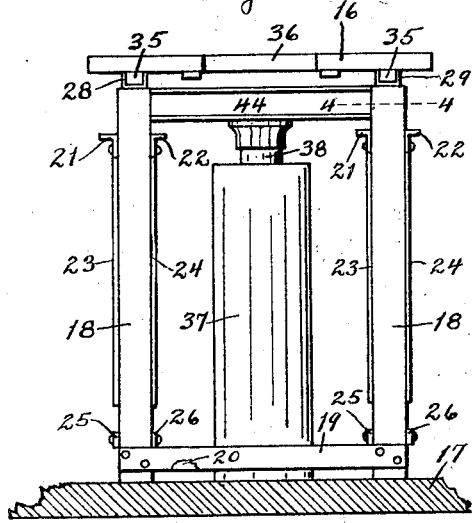
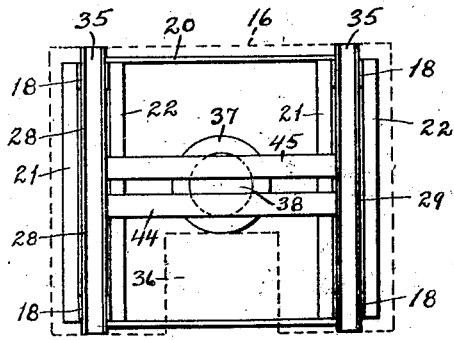
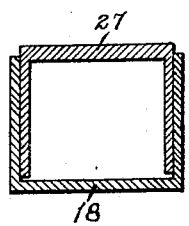
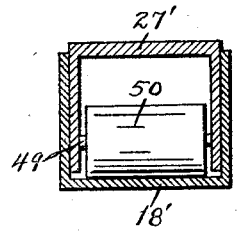
INVENTOR
WM. C. MYERS
BY
Earl M. Sinclair
ATTORNEY Patented May 20, 1924.

1,494,618

UNITED STATES PATENT OFFICE.

WILLIAM C. MYERS, OF DES MOINES, IOWA.

VEHICLE DUMPING MECHANISM.

Application filed March 19, 1923. Serial No. 626,182.

*To all whom it may concern:*

Be it known that I, WILLIAM C. MYERS, a citizen of the United States of America, and resident of Des Moines, Polk County, Iowa, have invented a new and useful Vehicle Dumping Mechanism, of which the following is a specification.

This invention relates to unloading apparatus and particularly to mechanism for dumping trucks, wagons, sleds or other vehicles containing granular substance.

An object of this invention is to provide improved means whereby the front end of the vehicle may be readily lifted for the purpose of dumping its contents by gravity at the rear end.

A further object of this invention is to provide a vertically movable platform normally disposed in a driveway, and means whereby the platform may be raised in a horizontal plane by mechanism which will not bind or easily get out of order.

A further object of this invention is to provide platform-raising means including rails vertically movable in guides or tracks and suitably braced to prevent binding and other troubles in operation.

With these and other objects in view, my invention consists in the construction, arrangement and combination of elements hereinafter set forth, pointed out in my claims and illustrated by the accompanying drawing, in which—

Figure 1 is a longitudinal vertical section of a truck dumping mechanism involving my invention, a truck being shown thereon in dotted lines. Figure 2 is an elevation of the lifted apparatus, partly in section, at right angles to the showing of Figure 1. Figure 3 is a plan view of the elements shown in Figure 2, the platform being removed and its position indicated by dotted lines. Figure 4 is a detail cross-section of one of the guides or tracks and vertically moving rails therein. Figure 5 is a view similar to Figure 4, with the addition of an anti-friction device.

In the construction of the mechanism as shown the numeral 10 designates a portion of a vehicle driveway which may be located in or form part of a grain elevator or other building adapted for the reception of grain or granular substance. The driveway 10 is formed with an opening 11 closable by a trap door 12 and leading to a chute 13 into which grain or the like is adapted to be discharged and carried to a suitable place provided for it. Located at a distance forwardly in the driveway from the opening 11 is another opening 15 adapted normally to be closed by a platform 16 forming a part of the driveway.

A frame is located beneath the driveway 10 beneath the opening 15 and supported on a suitable base or foundation such as 17. This frame includes four spaced guide or track members each designated by the numeral 18, said guide or track members being composed of channel beams vertically arranged and having their open faces disposed inwardly of the frame, along lines parallel with the sides of the driveway. The guides or tracks 18 are connected transversely by brace bars 19, 20 arranged near their lower ends and fixed to the closed faces of the channels. The guides or tracks 18 are further connected longitudinally of the driveway, in pairs, by angle bars 21, 22 arranged near their upper ends and fixed to opposite side walls of the channels. The guides or tracks 18 are further connected in pairs, longitudinally of the driveway, by inclined crossed brace bars 23, 24, fixed to the opposite side walls of the channels and extending from points near the bars 21, 22 to the lower end portions of said guides or tracks. The guides or tracks 18 are further connected in pairs longitudinally of the driveway by brace bars 25, 26 near their lower ends, connected to opposite side walls of the channels. Thus a rigid frame structure is provided and the guides or tracks 18 are held in proper positions.

A vertically movable frame is provided and is arranged within the rigid frame just described. The vertically movable frame includes four spaced rails or bars 27, each composed of a channel beam of slightly less dimension than the guides or tracks 18, and each of the rails or bars 18 is mounted in and adapted for vertical adjustment relative to one of said guides or tracks. The rails or bars 27 are arranged oppositely relative to the guides or tracks in which they are located, that is with their open faces toward the open faces of said guides or tracks, as clearly shown in Figures 4 and 5, and with their side walls contacting the inner faces of the side walls of the guides or tracks, which latter preferably are machined to permit free sliding engagement of the movable members. The rails or bars 27 are connected in pairs, longitudinally of the driveway, by upwardly opening channel sills 28, 29 mounted on the upper ends of said rails or bars and secured thereto by angle brackets 30. The rails or bars 27 also are connected in pairs, longitudinally of the driveway, by angle braces 31 supported on and fixed to angle brackets 32 fixed to the closed faces of said rails or bars and near the lower ends thereof. The rails or bars 27 also are connected in pairs, longitudinally of the driveway, by crossed braces 33, 34 arranged obliquely and fixed at their ends to closed faces of the channels. Thus the rails or bars 27 are securely braced together and racking of the movable frame is prevented, thereby eliminating binding of the rails or bars in their vertical movement in the guides or tracks 18. The platform 16 is supported on the channel sills 28, 29, within which wooden beams 35 preferably are inserted to receive attachment of the planks composing said platform. The platform 16 may be formed with a notch 36 in its rear side to permit clearance of the crank case of a motor truck occupying the device.

Any suitable means may be employed to control the raising and lowering of the movable frame and with it the platform 16 and any member which may be resting thereon. I have shown a means which has been in common use for this purpose, including a cylinder 37 vertically arranged within the rigid frame and resting on the base or foundation 17, and containing a piston device 38 adapted to be operated by air or other pressure from a tank 39, which may be located beneath a portion of the driveway 10. An air compressor 40 also is provided in communication with the storage tank 39 through a pipe 41. From the storage tank 39 a pipe 42 leads to the cylinder 37, and preferably this pipe is extended a suitable distance above the driveway 10 and provided with a suitable valve 43 for manual control of the flow of air to the cylinder. It is to be understood, however, that any other suitable means may be employed for raising the piston device in the cylinder. The upper end of the piston device 38 is in contact with a pair of I-beams, 44, 45, extending transversely beneath the channel sills 28, 29 and connected thereto by clamping plates 46 and bolts 47, at each end of said I-beams.

The vertically movable frame normally is at its lowermost limit of motion, at which time the piston device is down in the cylinder and the platform 16 is flush with the surface of the driveway 10. When a vehicle such as 48 approaches, whose contents are to be dumped into the chute 13 through the opening 11, it is so positioned that its front wheels rest on the platform 16, and the trap door 12 is opened. Then the valve 43 is manipulated in such manner as to admit fluid under pressure to the cylinder 37, which pressure causes the piston device 38 to rise, whereby upward pressure is exerted against the I-beams 44, 45 and through them upon the sills 28, 29 and vertically movable rails or bars 27, causing them to move upwardly in the guides or tracks 18. Such movement raises the platform 16 and with it the forward end of the vehicle, permitting the contents thereof to slip rearwardly through the rear end and be deposited in a common manner. Then the valve is manipulated to permit exhaust of the pressure in the cylinder, whereupon the rails and platform descend by gravity to normal position and the vehicle may pass from the driveway. Any suitable means may be provided to control the descent of the devices.

The channel rails or bars 27 move freely and without binding in the channel guides or tracks 18, because of their arrangement and their thorough bracing. It may be at times, however, that it will be desirable to employ anti-friction devices, which I have illustrated in Figure 5. The side walls of the channel 27' are pierced to provide means for carrying a rod or spindle 49 on which a roller 50 is journaled, adapted to engage the interior wall of the closed side of the guide or track channel 18'.

I claim as my invention—

1. In a vehicle dumping mechanism, a rigid frame including spaced channel beams uprightly arranged to constitute guides, braces connecting said guides; and a movable frame within said rigid frame including spaced channel rails arranged within said channel guides and slidable therein whereby said frames are mutually braced in all directions laterally, and braces connecting said channel rails, together with a platform carried by said movable frame.

2. In a vehicle dumping mechanism, a driveway, a rigid frame located beneath said driveway and including spaced channel beams arranged in upright position to constitute guides, braces rigidly connecting said channel guides; a movable frame within said rigid frame including spaced channel rails in and adapted for vertical movement relative to said channel guides, said channel rails having their open faces arranged oppositely to the open faces of the channel guides within which they are mounted, the arrangement of channel rails in the channel guides tending to prevent lateral movement of the movable frame in all directions relative to the rigid frame, braces connecting said channel rails in such manner as to prevent racking or binding in the guides; and a platform carried by the upper ends of said channel rails and adapted at times to form a part of said driveway.

3. In a vehicle dumping mechanism, a driveway, a rigid frame located beneath said driveway and including spaced channel beams arranged in upright position to constitute guides, braces rigidly connecting said channel guides; a movable frame within said rigid frame including spaced channel rails in and adapted for vertical movement relative to said channel guides, said channel rails having their open faces directed inwardly of the channel guides, the arrangement of channel rails in the channel guides tending to prevent lateral movement of the movable frame in all directions relative to the rigid frame, braces connecting said channel rails in such manner as to prevent racking of the movable frame or binding in the guides; channel sills connecting said channel rails in pairs longitudinally of the driveway, said channel sills opening upwardly, wooden beams arranged in said channel sills, and a platform mounted on and fixed to said wooden beams and adapted to form a part of said driveway at times, together with means for vertically moving said movable frame and platform.

4. In a vehicle dumping mechanism, a driveway, a rigid frame located beneath said driveway and including spaced channel beams arranged in upright position to constitute guides, braces rigidly connecting said channel guides; a movable frame within said rigid frame including spaced channel rails in and adapted for vertical sliding movement relative to said channel guides, braces connecting said channel rails in such manner as to prevent racking of the movable frame or binding in the guides; sills arranged on the upper ends of said channel rails and extending longitudinally of the driveway, a platform supported by said sills and adapted to be flush with the driveway at times, a pair of I-beams arranged transversely beneath and clamped to said sills, a cylinder arranged in upright position within the rigid frame, and a piston device in said cylinder engaging at its upper end said I-beams.

5. In a vehicle dumping mechanism, a rigid frame including four spaced channel beams arranged in upright position to form guides, said beams being arranged in pairs with their open faces toward each other in the pairs, braces fixed to side walls and connecting said channel beams in pairs, other braces fixed to the closed sides and connecting said beams transversely in pairs; a movable frame within said rigid frame including four spaced channel rails in and adapted for vertical sliding movement in said channel guides, said channel rails being arranged with the open faces directed within said channel guides, angle brackets fixed to the closed faces of alining channel rails, longitudinal braces fixed to said brackets and connecting said rails in pairs, other inclined braces fixed to closed faces of said channel rails and connecting the same in pairs, and sills resting upon the upper ends of said channel rails and connecting the same in pairs, together with a platform carried by said sills.

6. In a vehicle dumping mechanism, a rigid frame including spaced channel beams uprightly arranged to constitute guides, braces connecting said guides, and a movable frame within said rigid frame including spaced channel rails arranged within said channel guides and slidable therein, said channel rails having their open faces arranged oppositely to and directed inwardly of the channel guides, together with a platform carried by said movable frame, and roller bearings mounted within and pivotally carried by the side flanges of the channel rails and adapted for rolling contact with inner surfaces of the closed sides of the channel guides.

7. In a vehicle dumping mechanism, a rigid frame including spaced channel beams uprightly arranged to constitute guides, braces connecting said guides, and a movable frame within said rigid frame including spaced channel rails arranged within said channel guides and slidable therein whereby lateral movement of said movable frame in any direction is prevented, and braces connecting said rails, the inner faces of the side flanges of said guides being machined for sliding engagement by side flanges of said rails.

Signed at Des Moines, in the county of Polk and State of Iowa, this 27" day of February, 1923.

WILLIAM C. MYERS.